(12) United States Patent
Morvillo et al.

(10) Patent No.: US 11,065,982 B2
(45) Date of Patent: Jul. 20, 2021

(54) METHOD AND SYSTEM OF INSTALLATION OF A PLURALITY OF DROPPERS OF AN OVERHEAD CONTACT SYSTEM SECTION

(71) Applicant: ALSTOM Transport Technologies, Saint-Ouen (FR)

(72) Inventors: Ciro Morvillo, Torre del Greco (IT); Emanuele Massari, Valmontone (IT)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 215 days.

(21) Appl. No.: 16/231,590

(22) Filed: Dec. 23, 2018

(65) Prior Publication Data
US 2019/0202321 A1    Jul. 4, 2019

(30) Foreign Application Priority Data
Jan. 2, 2018 (EP) .................................. 18305001

(51) Int. Cl.
| | |
|---|---|
| *B60M 1/28* | (2006.01) |
| *B60M 1/22* | (2006.01) |
| *B60M 1/23* | (2006.01) |
| *G01S 17/08* | (2006.01) |

(52) U.S. Cl.
CPC ................ *B60M 1/28* (2013.01); *B60M 1/22* (2013.01); *B60M 1/23* (2013.01); *G01S 17/08* (2013.01)

(58) Field of Classification Search
CPC .. B60M 1/28; B60M 1/22; B60M 1/23; G01S 17/08
See application file for complete search history.

(56) References Cited

FOREIGN PATENT DOCUMENTS

| | | | | | |
|---|---|---|---|---|---|
| CN | 102381212 | * | 3/2012 | ............. | B60M 1/28 |
| CN | 102381212 | A | 3/2012 | | |
| CN | 105691243 | * | 6/2016 | ............. | B60M 1/28 |
| CN | 105691243 | A | 6/2016 | | |
| GB | 2260033 | A * | 3/1993 | ............. | B60M 1/28 |
| GB | 2260033 | A | 3/1993 | | |
| JP | 2004217149 | A * | 8/2004 | ............. | B60M 1/28 |
| JP | 2004217149 | A | 8/2004 | | |

OTHER PUBLICATIONS

Yukita; Mounting Device of Electric Car Wire Hanger (EPO English Machine Translation), Jan. 5, 2020, pp. 1-5 (Year: 2020).*
European Patent Office, Patent Abstracts of Japan, Publication No. 2004217149, Aug. 5, 2004, Sanwa Tekki Corp., 1 page.
European Search Report for EP Application No. 18305001, dated May 24, 2018, 8 pp.

* cited by examiner

*Primary Examiner* — Bayan Salone
(74) *Attorney, Agent, or Firm* — Soquel Group LLC

(57) ABSTRACT

A method including measuring a distance between two successive supporting poles delimiting a section to be realized, inputting data into a computer programmed to output a layout plan indicating a position and a length for each dropper to install, preparing each dropper with a dedicated machine, moving a first platform along the section, which is equipped with a position unit and a marking device to set a mark on the contact wire at each position where a dropper is to installed, moving a second platform along the section, the second platform being loaded with the droppers that have been prepared, and fixing manually each dropper between the messenger wire and the contact wire in registration with a corresponding mark set on the contact wire.

7 Claims, 2 Drawing Sheets

METHOD AND SYSTEM OF INSTALLATION OF A PLURALITY OF DROPPERS OF AN OVERHEAD CONTACT SYSTEM SECTION

CROSS-REFERENCE TO RELATED APPLICATIONS

This application claims priority of European Patent Application No. 18 305 001.2, filed on Jan. 2, 2018.

FIELD OF THE INVENTION

The present invention concerns a method and a system of installation of the droppers of an overhead contact system.

BACKGROUND OF THE INVENTION

FIG. 1 represents a first type of an overhead contact system section, sometimes also called a catenary system. A section 10 of the overhead contact system comprises one contact wire 12 suspended above the pair of rails 2 and 3 of a track 1. The contact wire 12 is hung by means of a plurality of droppers 21-28 to one messenger wire 14. The messenger wire 14 is supported at intervals by support poles erected successively along the track 1. Two successive support poles delimit a section of the overhead contact system, such as the support poles 31 and 32 delimiting the section 10.

Between two successive support poles, the messenger wire assumes the form of a curve that is called a catenary. This curve results from the balance between the different mechanical forces applied on the messenger wire. It can be precisely calculated given the distance between the support poles, the mass per unit length of the contact line, the messenger line and the droppers, and the number of droppers and the interval between two successive droppers.

On the contrary, the contact wire must be set at a predetermined height relative to the rails to be sure that the pantograph of a train running on the track stays in a suitable contact with it: This height must not be too high to avoid the pantograph to lose the contact with the contact wire, the formation of a gap leading to an electric arcs and a variation in the electric power supplied by the overhead contact line to the train; This height must not be too low to avoid the pantograph to lift the contact wire and apply a mechanical force while the train is moving which would cause the breaking of the contact wire.

Knowing theoretically the position of the support poles, the height at which the contact wire must be set and the shape of the curve assumed by the messenger wire, the length and position of each dropper of a section can be calculated in the engineering and design department. A layout plan is thus generated and used on site as follows.

A workman walks from one pole to the other along the track and paints marks on the ballast above which a dropper has to be installed.

Prefabricated droppers are sourced and delivered on site in yarns of different but defined lengths.

Once the contact and messenger wires have been suspended, the yards of prefabricated droppers are loaded on a lifting platform.

The platform, operated manually, is then moved along the track and stopped roughly in correspondence with each mark on the ballast.

At each stop, the workman reads the layout to determine the length of the dropper to be installed at this point.

A dropper is taken from the suitable yarn and is clamped by its ends to the messenger wire and the contact wire respectively.

Such an installation method involves heavy manual and time-consuming operations to prepare and correctly position the droppers.

It is prone to human errors cause by a misreading of the layout plan.

In addition, when it is performed for repairing a fallen overhead contact system, a short period of time is allowed to minimize the impact on the operation of the railway. The workmen have to work as fast as possible in a time window of several hours. Often such a time window is only available at night, rendering the task particularly difficult, the workmen having to distinguish the marks on the ballast in low ambient light conditions.

Other types of overhead contact system are known, in particular a second type comprising two contact wires supported by one single messenger wire or a third type comprising two contact wires supported by two messenger wires. Obviously, the droppers for each of these other types of overhead contact system are specific of that system, but are installed essentially in the same way than the droppers of the first type of overhead contact system. Thus these other types of overhead contact systems suffer the same disadvantages.

SUMMARY OF THE DESCRIPTION

The object of the present invention is to remedy this problem. The subject-matter of the invention is a method and a system to implement said method as defined by the claims.

BRIEF DESCRIPTION OF THE DRAWINGS

The invention will be more easily understood by way of a preferred embodiment illustrated by the accompanying drawings, on which.

DETAILED DESCRIPTION

Figure 1:
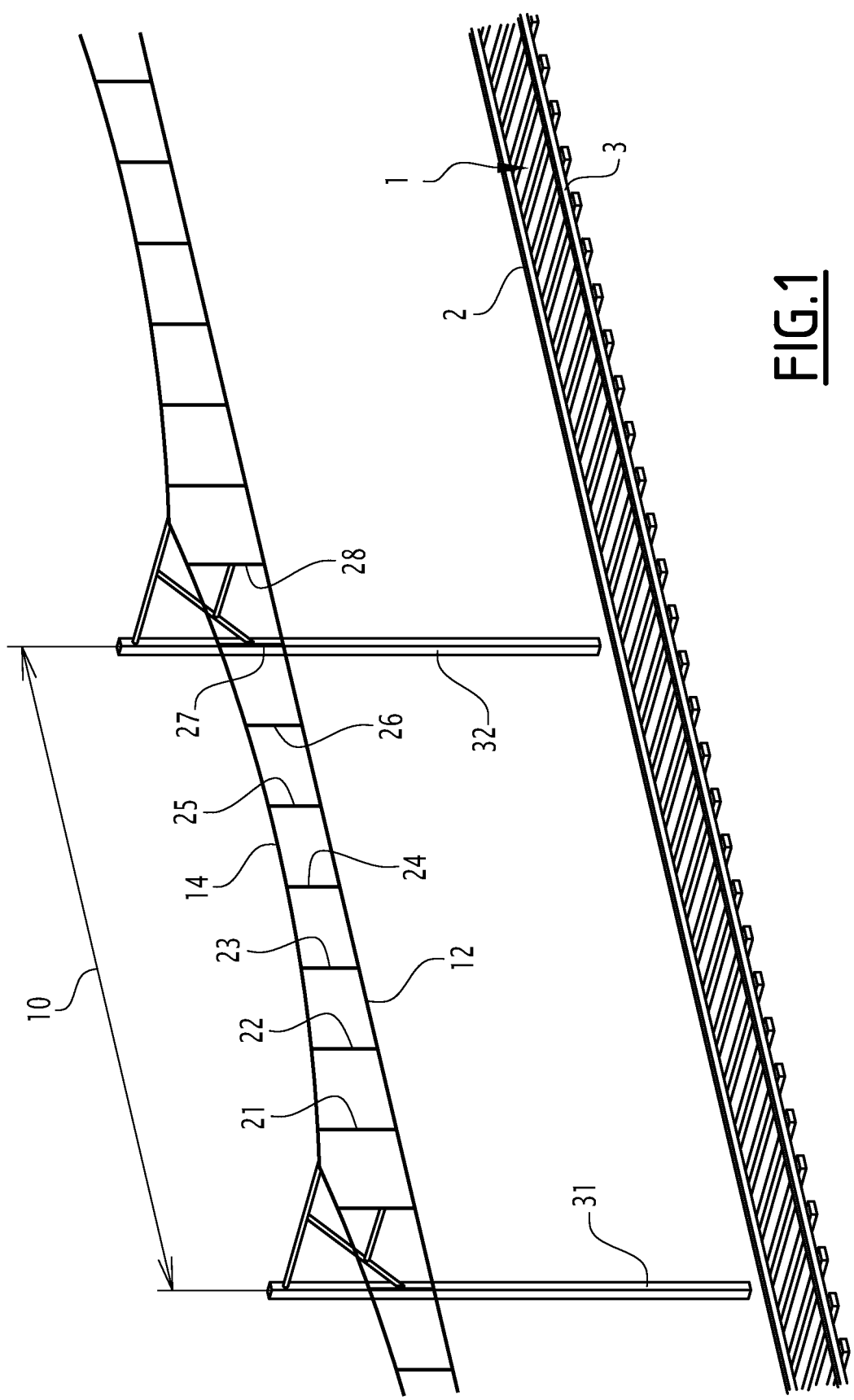
FIG. 1 is an overhead contact system obtained by the implementation of the method according to the invention.

For realizing the section 10 of the overhead contact system of FIG. 1, the method of implantation of plurality of droppers according to the invention will now be described by reference to FIGS. 2 to 5.

Figure 2:
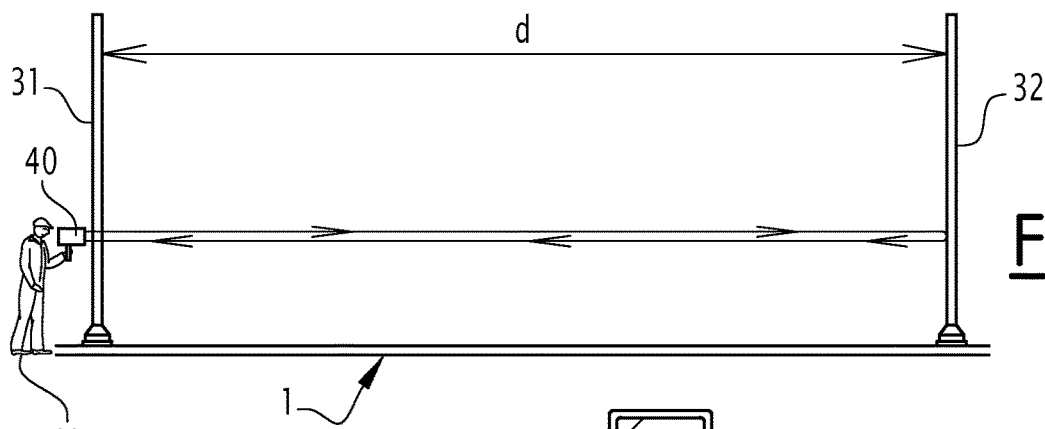
FIGS. 2 to 5 represent schematically the successive steps of the method according of the invention, each step involving a device, a machine or a platform constituting parts of the system according to the invention.

FIG. 2 corresponds to a first step consisting in the measurement of the distance d between the two successive supporting poles 31 and 32 of the considered section of the overhead contact system.

A laser scanner 40 is used by a workman 41 to realize this measurement. In another embodiment, a GPS device is used in place of the laser scanner.

Other parameters of interest may also be measured in this first step, such as the altitude difference between the support poles 31 and 32, when the track 1 is not horizontal.

Figure 3:
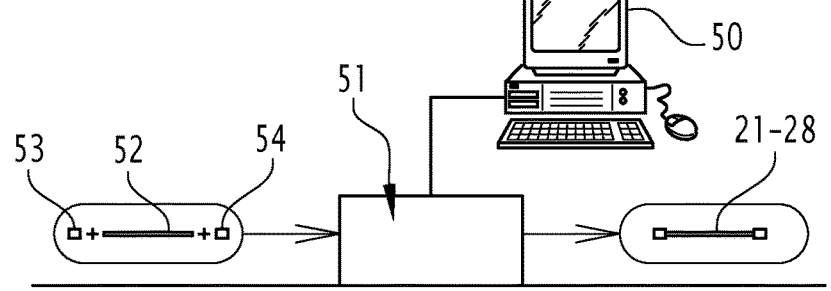

FIG. 3 corresponds to a second step and a third step of the method.

In the second step, a computer 50 is used to determine a layout plan of section 10 to be realized.

Information is inputted into a computer 50. Said information comprises at least the distance d measured in the first step, and advantageously the other parameters of interest measured in the first step. This information may comprise also configuration variables, such that the number of droppers per section.

The computer 50 is programmed to determine the form of the messenger wire 14, taking into account the information input.

The layout plan output by computer 50 indicates, for each dropper 21 to 28 of section 10, an id of the dropper, a length of the dropper and a position pi of the dropper.

The position pi of the $i^{th}$ dropper may for example be the distance from the support pole 31 chosen as reference.

In the third step, each dropper is manufactured at its correct length as indicated by the layout plan. To this end, a dedicated machine 51 is used. It is interfaced with the computer 50, which thus command the manufacturing of the droppers.

The machine 51 assembles the different components of a dropper. For example, a cable is cut at the correct length 52 and clamp mechanisms 53 and 54 are fixed at each of its ends to obtain the desired dropper. Droppers 21 to 28 are thus fabricated.

Figure 4:
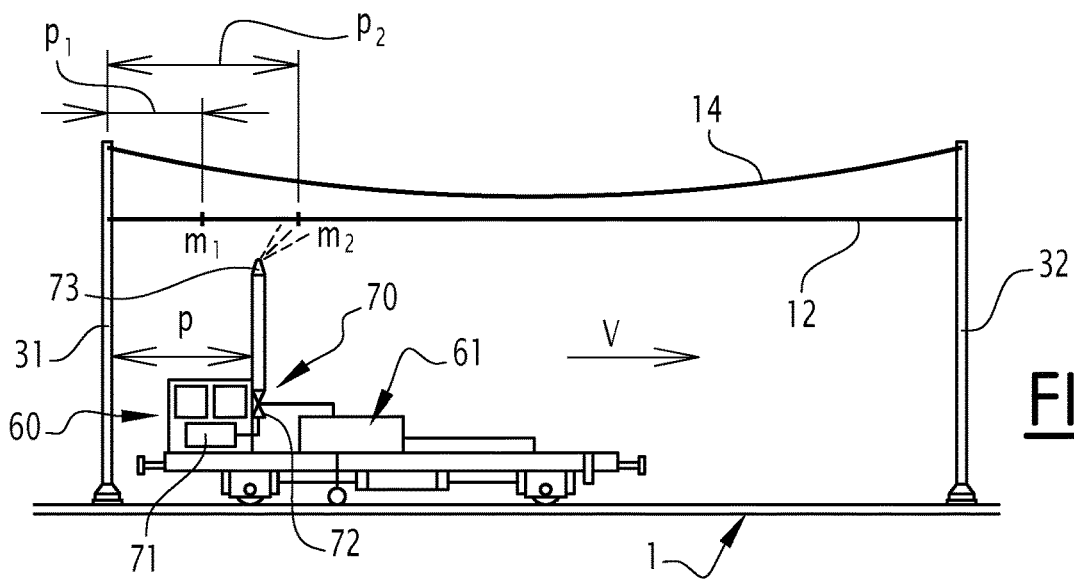

FIG. 4 represents a fourth step and a fifth step.

In the fourth step, a first platform 60 is driven along track 1, as indicated by arrow V, from the support pole 31 to the support pole 32.

The first platform 60 is equipped with a positioning unit 61 for determining the actual position p of the first platform 60. The positioning unit 61 comprises preferably an odometer to provide a precise positioning of the first platform. The position p output by the position unit 61 is reset when the first platform 60 passes the support pole 31 which is taken as a reference. Thus the position p given at each time by the position unit 61 is the distance from the support pole 31.

The first platform 60 also comprises a marking device 70 capable of marking the contact wire 12. For example, the marking device 70 comprises a paint container 71, an actuated valve 72 and a nozzle 73 situated at the extremity of a mast so as to be in the vicinity of the contact line 12. Each time the valve is actuated, a spray of paint is applied through the nozzle onto the contact line. In the fifth step, the marking device 70 is actuated by the positioning unit 61 each time the current position p of the first platform 60 is equal to the position pi of a dropper as indicated by the layout plan, which have been loaded into the positioning unit 61.

At the end of the fifth step, the contact wire 12 has a plurality of marks mi, mark mi corresponding to the point where the $i^{th}$ dropper has to be installed. In FIG. 4, mark m1 has been painted on contact wire 12 at position pi and mark m2 is in the process of being applied at position p2.

Advantageously, the first platform 60 is also equipped with a dedicated system that is able to apply the final tension to the contact wire 12. The tension is applied on the contact wire 12 during the movement of the first platform 60. The marks are then drawn on the contact wire correctly stretched. A better precision on the location of the marks is thus obtained.

Figure 5:
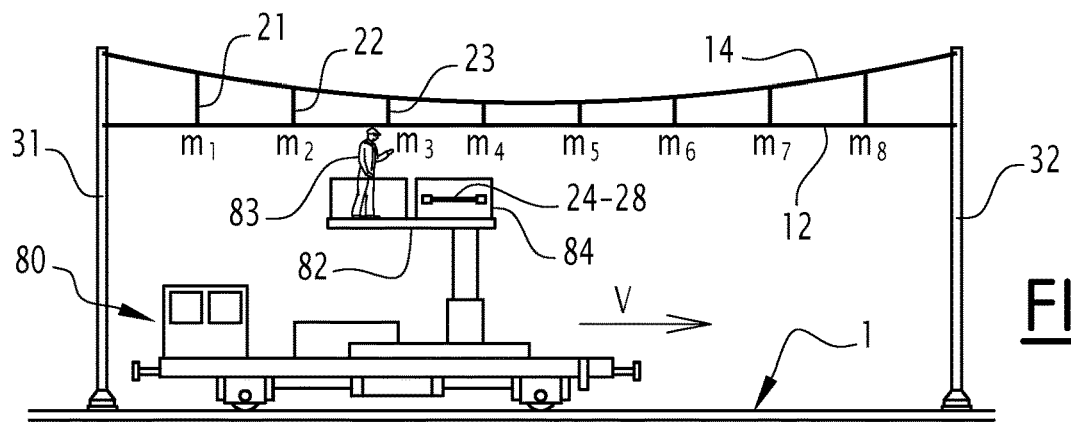

FIG. 5 represent a sixth step and a seventh step.

In the sixth step, a second platform 80 is moved along the track 1, as indicated by arrow V, from the support pole 31 to the support pole 32.

The second platform is provided with an aerial device 82.

The aerial device 82 is loaded with the droppers 21 to 28 which have been prepared and have to be installed. The droppers are preferably placed into a delivery means 81, such that they will be presented to the workman 83 in the order of their installation as the second platform 80 moves along section 10.

In the seventh step, when the workman 83 can see mark mi on the contact wire 12, he stops the second platform 80 and fixes the corresponding dropper between the messenger wire and a contact wire in registration with mark mi.

In FIG. 5, droppers 21 and 22 have been installed, and dropper 23 is in the process of being installed.

Once a dropper has been installed, the workman drives the second platform 80 to the next mark. This process is repeated until the support pole 32 is reached.

The technical teaching of the previous description made in relation to the first type of overhead contact system can be readily adapted by a person skilled in the art for the specific case of the droppers equipping another type of overhead contact system, such as a second type where droppers connect one messenger wire with two contact wires or the third type where droppers connect two messenger wires with two contact wires.

For example, the computer is programmed to calculate a layout plan suitable for the type of overhead contact system to be realized. Incidentally, the type of overhead contact system to be realized may be a configuration parameter the operator has to initially set.

The machine is also adapted to interpret one suitable layout plan and to manufacture the correct dropper for the type of overhead contact system to be realized.

Similarly, when the overhead contact system comprises two contact wires, the first platform is adapted to put marks on each of the two contact wires.

While in two different vehicles are used the embodiment presented in details above, other arrangements may be made and used.

For example, the measurement means used in the first step to measure the relevant data on site may be placed onboard the first platform and operated automatically. When the first platform is at the level of the first post, as determine by the odometer, the measurement means are activated to get at least the distance with the second post. This and other measurements are remotely transmitted to the computer on the ground.

In another embodiment, the computer is also onboard the first platform to determine the correct layout plan and to pilot the unit to mark the contact wire or wires. The layout plan is remotely transmitted to the machine, located on the ground, to prepare the droppers.

In another embodiment, the machine is onboard the second platform to manufacture the droppers, preferably as the installation process goes on and the second platform moves along the tracks.

In another embodiment, a unique platform is used throughout the method, which combines the means arranged on the first and second platforms of the previous embodiments.

The person skilled in the art will understand that the solution according to the invention allows the manual operations related to marking the position of the droppers to be avoided.

The automatic marking is faster and more reliable.

The determination of the layout plan on site allows taking into account the real and exact configuration of the overhead contact system and the track, as they have been realized.

The manufacturing of the droppers on site based on the precise layout plan leads to material and cost savings.

Finally, the method provides a precise installation of the droppers with the exact length so that the overhead contact system obtained is within the tolerances required for such a system. A lengthy and painful process of adjusting the droppers once in place to respect these tolerances can be spared.

Because the use of the present system is firstly aimed at repairing a damaged overhead contact system impairing the proper exploitation of a rail line, the maintenance operation has to take a minimum amount of time while offering the guaranty to deliver an operational overhead contact system to be able to restart as soon as possible the full exploitation of the rail line. To reach that goal, the system comprises redundant components. For example, the system comprises two marking devices, so that, in case of failure of the first position device, the second device is used and the process can still be realized.

The invention claimed is:

1. A system of installation of a plurality of droppers of an overhead contact system section, which comprises at least one contact wire and at least one messenger wire hung between two successive supporting poles delimiting the ends of said overhead contact system section, the system comprising:
   a means of measuring a distance between the two successive supporting poles;
   a computer programmed to output a layout plan indicating a position and a length for each dropper of the plurality of droppers to be installed based on inputted data, that comprises at least the distance measured by said means of measuring a distance;
   a machine for preparing each dropper to be installed at the length thereof indicated in the layout plan output by said computer;
   a first platform capable of moving along the overhead contact system section, the first platform being equipped with:
      a position unit for determining the actual position of the first platform; and
      a marking device to set a mark on the at least one contact wire, the marking device being capable of setting a mark on the at least one contact wire each time the position determined by said position unit corresponds to a position of a dropper of the plurality of droppers as indicated in the layout plan, the marking device comprising:
         a paint container;
         an actuated valve; and
         a nozzle situated at the extremity of a mast so as to be in the vicinity of the at least one contact wire, so that, each time said valve is actuated, a spray of paint is applied through the nozzle onto the at least one contact wire, the marking device being actuated by said positioning unit each time the current position of said first platform is equal to the position of a dropper as indicated by the layout plan, which has been loaded into said positioning unit; and
   a second platform capable of moving along the overhead contact system section and being loaded with the droppers that have been prepared.

2. A system according to claim 1, wherein the overhead contact system section to be realized is of the type comprising:
   one messenger wire and one contact wire; or
   one messenger wire and two contact wires; or
   two messenger wires and two contact wires,
wherein said computer is configured to output a layout plan corresponding to the type of the overhead contact system section to be realized, and wherein said machine is capable of manufacturing droppers corresponding to the type of the overhead contact system section to be realized.

3. A system according to claim 1, wherein, when the overhead contact system section comprises two contact wires, said marking device marking each contact wire separately.

4. A system according to claim 1, wherein said means of measuring a distance between the two successive supporting poles is placed on board said first platform and is operated automatically.

5. A system according to claim 1, wherein said machine for preparing each dropper to be installed is placed onboard said second platform.

6. A system according to claim 1, wherein said first and second platforms are arranged to constitute a single platform.

7. A system according to claim 1, wherein said first platform is also equipped with a dedicated system that is able to apply a final tension to the at least one contact wire, the tension being applied on the at least one contact wire during movement of said first platform, the marks being then drawn on the at least one contact wire correctly stretched.

* * * * *